(12) United States Patent
Nagurny

(10) Patent No.: US 8,353,162 B2
(45) Date of Patent: Jan. 15, 2013

(54) RECOVERABLE HEAT EXCHANGER

(75) Inventor: Nicholas J. Nagurny, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 744 days.

(21) Appl. No.: 12/371,586

(22) Filed: Feb. 14, 2009

(65) Prior Publication Data

US 2010/0205961 A1    Aug. 19, 2010

(51) Int. Cl.
*F01K 27/00* (2006.01)
*F03G 7/00* (2006.01)
*F03G 7/04* (2006.01)
*F03G 7/06* (2006.01)

(52) U.S. Cl. ............... 60/641.7; 60/641.1; 60/641.6

(58) Field of Classification Search ............ 60/398, 60/495, 496, 641.1, 641.6, 641.7, 641.8, 60/641.11, 641.12, 641.13, 641.14, 641.15; 165/45
See application file for complete search history.

(56) References Cited

U.S. PATENT DOCUMENTS

| | | | | |
|---|---|---|---|---|
| 3,896,622 A * | 7/1975 | Daniello | ...... | 60/641.7 |
| 4,281,514 A * | 8/1981 | Egerer | ...... | 60/641.1 |
| 4,286,434 A * | 9/1981 | Moisdon | ...... | 60/641.7 |
| 4,350,014 A * | 9/1982 | Sanchez et al. | ...... | 60/641.7 |
| 4,384,459 A * | 5/1983 | Johnston | ...... | 60/641.7 |
| 4,781,029 A * | 11/1988 | SerVaas | ...... | 60/641.7 |

* cited by examiner

*Primary Examiner* — Thomas Denion
*Assistant Examiner* — Christopher Jetton
(74) *Attorney, Agent, or Firm* — Kaplan, Breyer, Schwarz & Ottesen, LLP

(57) ABSTRACT

A modular heat exchanger that can be submerged to great depths and then easily recovered in order to reduce the costs and disadvantages of the prior art. Because the heat exchanger is submergible and recoverable, it can be more easily maintained. This ease of maintenance allows the heat exchangers to be deployed at greater depths. This, in turn, allows for greater differences in temperatures, greater efficiency for the heat engine, and a more effective ocean thermal energy conversion system.

17 Claims, 4 Drawing Sheets

Ocean Thermal Energy-
Conversion System 100

Ocean Thermal Energy-Conversion System 200
(at time = $t_0$)

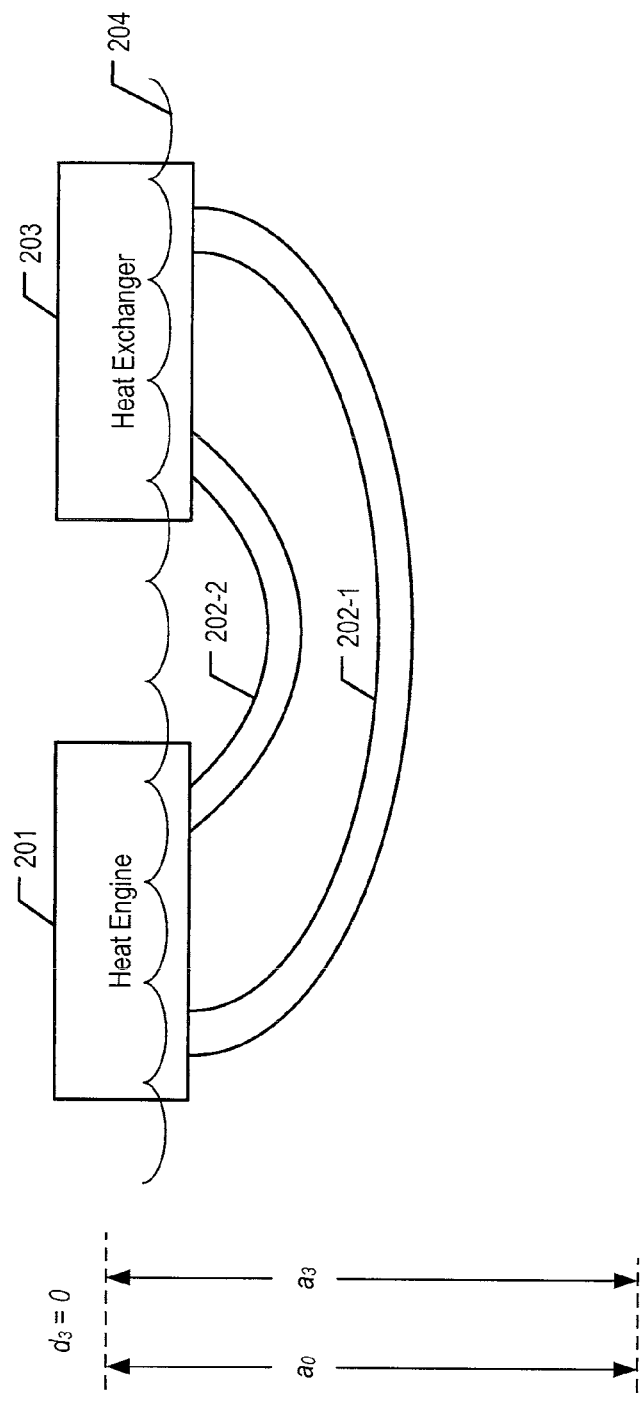
Figure 4  Ocean Thermal Energy-Conversion System 200 (at time = $t_2$)

RECOVERABLE HEAT EXCHANGER

FIELD OF THE INVENTION

The present invention relates to heat exchangers in general, and, more particularly, to ocean thermal energy conversion.

BACKGROUND OF THE INVENTION

Ocean thermal energy conversion systems are systems that generate electricity by harnessing the difference in the temperature of the ocean at the surface and the temperature of the ocean at depth.

Sunlight cannot penetrate deep in the ocean, and, therefore, the temperature deep in the ocean is constantly cold. In contrast, the water at the surface is heated by the sun and is warmer. A heat engine uses this temperature difference to create kinetic energy, which can be used, for example, to generate electricity.

As the temperature difference between the cold water and the warm water increases, the efficiency of the heat engine increases. One way to effectively harness the temperature difference between the cold water and the warm water is to place the heat engine and the heat exchangers as far from one another as possible. This means placing the cold water heat exchanger as deep in the water as possible.

The problem with placing the cold water heat exchanger deep in the ocean is maintaining the heat exchanger. In order to operate these systems effectively, the heat exchangers must be cleaned and maintained regularly. Sea water is highly corrosive to the metal used in heat exchangers, causing oxidation and leaks. Another problem is that ocean life, like barnacles and seaweed, grow on the heat exchangers. This is difficult and costly to do when the heat exchangers are deep in the ocean.

FIG. 1 depicts a schematic diagram of the salient components of an ocean thermal energy conversion system in the prior art. FIG. 1 comprises heat engine 101, pipe 102-1, pipe 102-2, heat exchanger 103, and water surface 104.

SUMMARY OF THE INVENTION

The present invention is a modular heat exchanger that can be submerged to great depths and then easily recovered in order to reduce the costs and disadvantages of the prior art.

Because the heat exchanger is submergible and recoverable, it can be more easily maintained. This ease of maintenance allows the heat exchangers to be deployed at greater depths. This, in turn, allows for harnessing greater differences in temperatures, greater efficiency for the heat engine, and a more effective ocean thermal energy conversion system.

BRIEF DESCRIPTION OF THE DRAWINGS

FIG. 4 depicts a diagram of the salient components of the illustrative embodiment of the present invention as it is configured at time $t_2$.

DETAILED DESCRIPTION

Figure 1:
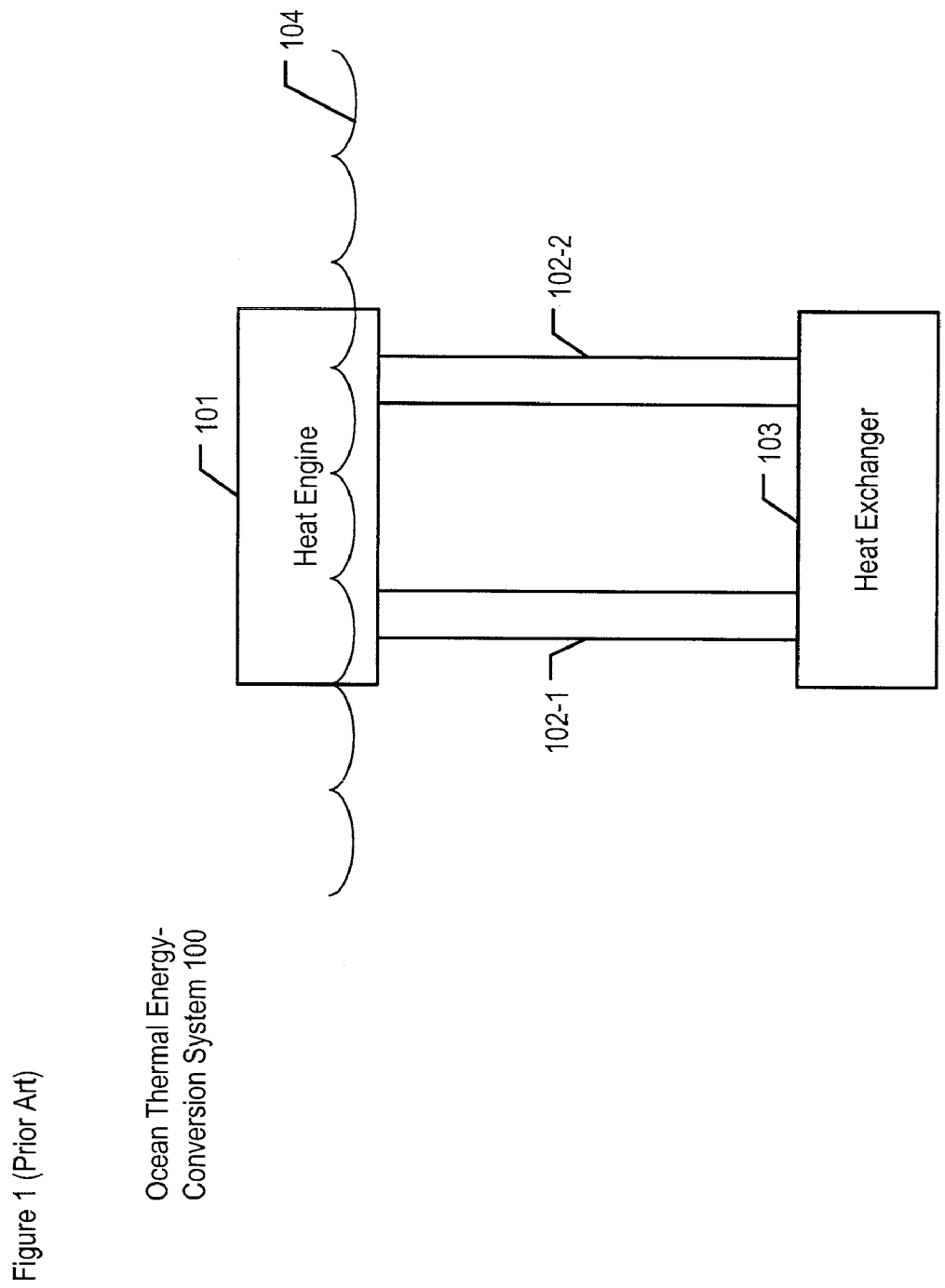
FIG. 1 depicts a schematic diagram of the salient components of an ocean thermal energy conversion system in the prior art.
Figure 2:
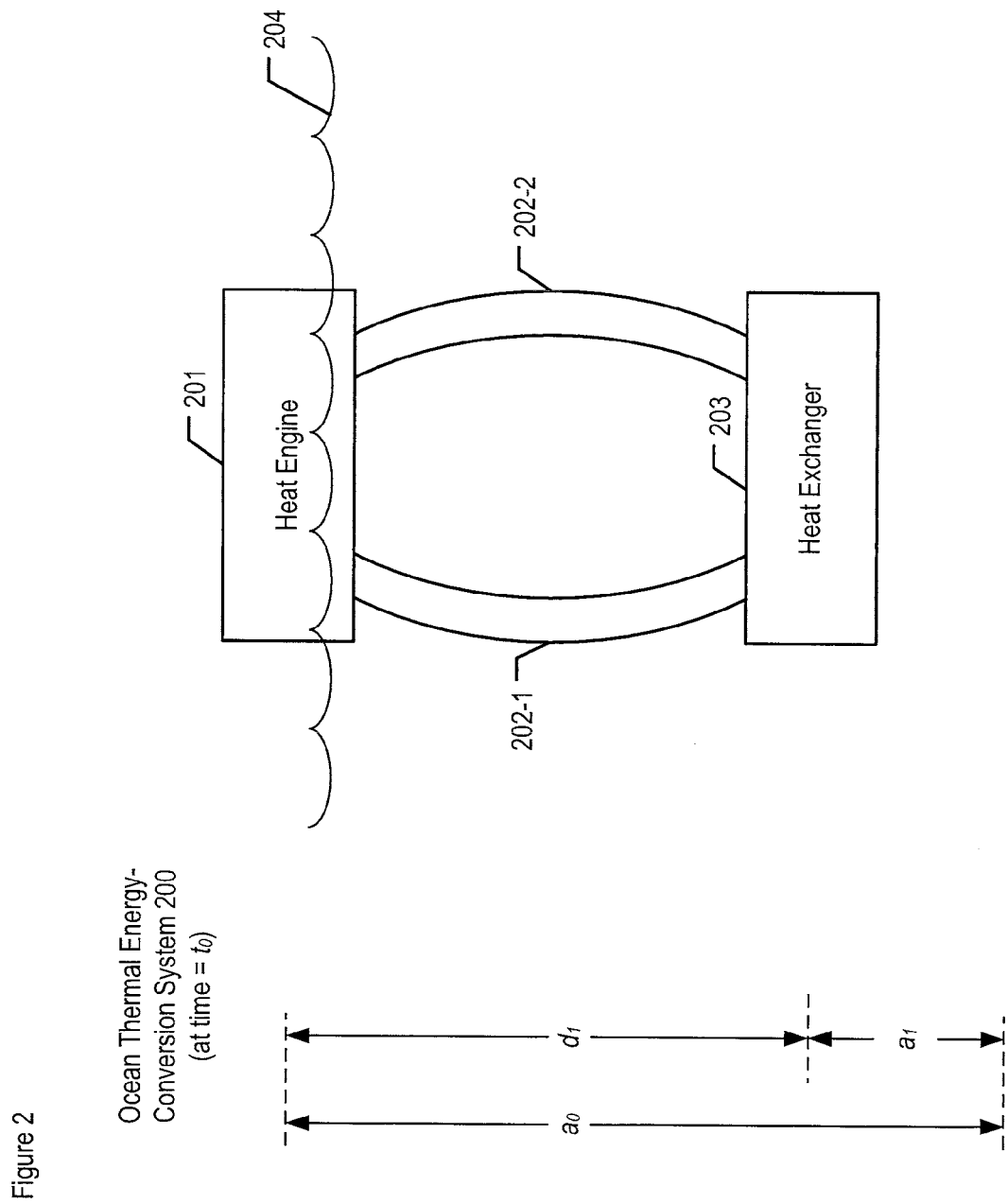
FIG. 2 depicts a diagram of the salient components of ocean thermal energy conversion system 200 in accordance with the illustrative embodiment of the present invention as it is configured at time $t_0$.

FIG. 2 depicts a diagram of the salient components of ocean thermal energy conversion system 200 in accordance with the illustrative embodiment of the present invention as it is configured at time $t_0$. Ocean thermal energy-conversion system 200 comprises: heat engine 201, flexible conduit 202-1, flexible conduit 202-2, heat exchanger 203, and water surface 204.

Although the illustrative embodiment comprises two conduits connecting heat engine 201 to heat exchanger 203, it will be clear to those skilled in the art, after reading this disclosure, how to make and use alternative embodiments of the present invention that comprise one or more conduits.

Although the illustrative embodiment comprises one heat exchanger, it will be clear to those skilled in the art, after reading this disclosure, how to make and use alternative embodiments of the present invention that comprise two or more heat exchangers.

Although the illustrative embodiment comprises one heat engine, it will be clear to those skilled in the art, after reading this disclosure, how to make and use alternative embodiments of the present invention that comprise two or more heat engines.

Although heat engine 201 floats, partially submerged, on water surface 204, it will be clear to those skilled in the art, after reading this disclosure, how to make and use alternative embodiments of the present invention in which heat engine 201 is completely out of the water (e.g., upon a platform, is on land, etc.) or is submerged.

Heat engine 201 is a device that converts thermal energy into mechanical energy. This mechanical energy can in turn be converted into electricity if so desired. In the illustrative embodiment, the heat engine runs on the Rankine cycle. In the illustrative embodiment of the present invention, heat engine 201 is floating on ocean surface 204. The heat engine can take advantage of the difference in the temperature of water surface 204 and the temperature difference between ocean surface 204 and the temperature of submerged heat exchanger 203. In any event, it will be clear to those skilled in the art, after reading this disclosure, how to make and use heat engine 201.

Conduit 202-1 and conduit 202-2 are flexible conduits which connect heat exchanger 203 and heat engine 201. The working fluid is transported between heat exchanger 203 and heat engine 201 through conduit 202-1 and conduit 202-2.

Although the illustrative embodiment comprises flexible conduits, it will be clear to those skilled in the art, after reading this disclosure, how to make and use alternative embodiments of the present invention in which some or all of the conduits are not flexible.

In accordance with the illustrative embodiment, the working fluid would be ammonia, but it will be clear to those skilled in the art, after reading this disclosure that other fluids can be used, such as water (sea water or fresh water). In any event, it will be clear to one skilled in the art, after reading this disclosure how to make and use conduit 202-1 and conduit 202-2.

Heat exchanger 203 is a device for heat transfer. In the illustrative embodiment, heat exchanger 203 takes in warm fluid from heat engine 201 and cools the warm fluid, condensing it and then it flows back to heat engine 201.

Although the illustrative embodiment has heat exchanger 203 comprising a condensing cycle, it will be clear to those skilled in the art, after reading this disclosure, how to make and use alternative embodiments of the heat exchanger 203 in which it performs the vaporization part of the cycle. In any event, it will be clear to one skilled in the art, after reading this disclosure how to make and use heat exchanger 203.

Figure 3:
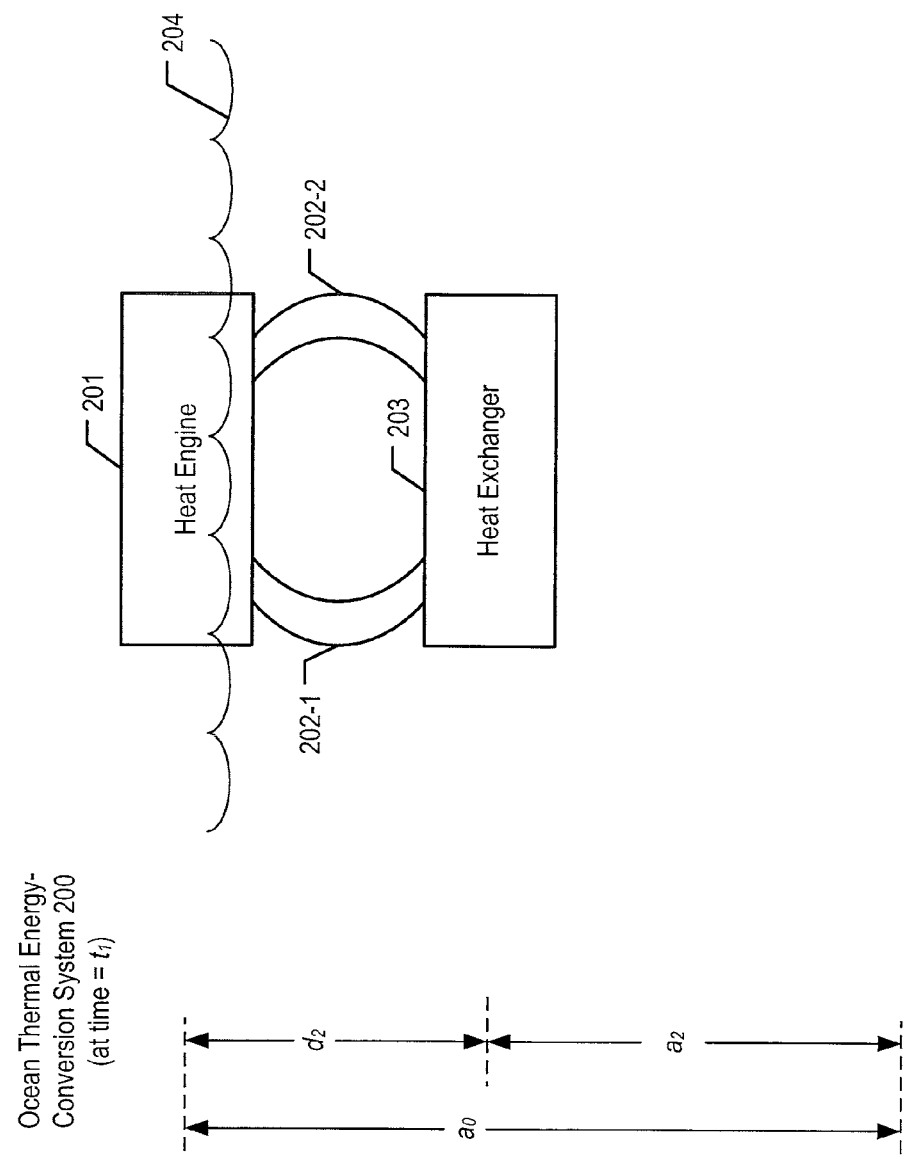
FIG. 3 depicts a depicts a diagram of the salient components of ocean thermal energy conversion system 200 in accordance with the illustrative embodiment of the present invention as it is configured at time $t_1$.

FIG. 3 depicts a depicts a diagram of the salient components of ocean thermal energy conversion system 200 in accordance with the illustrative embodiment of the present invention as it is configured at time $t_1$. FIG. 3 comprises: heat engine 201, flexible conduit 202-1, flexible conduit 202-2, heat exchanger 203, and water surface 204.

FIG. 4 depicts a diagram of the salient components of the illustrative embodiment of the present invention as it is configured at time $t_2$. FIG. 3 comprises: heat engine 201, flexible conduit 202-1, flexible conduit 202-2, heat exchanger 203, and water surface 204.

Although the illustrative embodiment depicts heat exchanger 203 and heat engine 201 at the same altitude, it will be clear to those skilled in the art, after reading this disclosure how to make and use alternative embodiments of the present invention wherein the heat exchanger is at any depth and distance from the heat engine.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
   a heat engine at a surface of a body of water at time $t_0$ and time $t_1$, wherein $t_0 \neq t_1$;
   a heat exchanger for cooling a vapor-phase fluid received from the heat engine, wherein the heat exchanger:
   (a) is at a first depth, $d_1$, at time $t_0$;
   (b) is substantially at the surface of the body of water at time $t_1$;
   (c) condenses the vapor-phase fluid when at the first depth, $d_1$;
   (d) returns the condensed fluid to the heat engine while at the first depth; $d_1$ and
   (e) is not operational when it is at the surface of the body of water at time $t_2$; and
   a first flexible conduit for transferring the vapor-phase fluid from the heat engine to the heat exchanger.

2. The apparatus of claim 1 further comprising a second flexible conduit for transferring condensed fluid from the heat exchanger to the heat engine.

3. The apparatus of claim 2 wherein the first flexible conduit and the second flexible conduit are not coaxial with respect to one another.

4. A method comprising:
   submerging a heat exchanger to a depth, $d_1$, below the surface of a body of water;
   transferring to the heat exchanger, from a heat engine at the surface of the body of water, a vapor phase working fluid via a first flexible conduit;
   condensing the vapor phase working fluid in the heat exchanger;
   returning, via a second flexible conduit, the condensed working fluid to the heat engine after cooling;
   ceasing the condensing of the working fluid;
   returning the heat exchanger to the surface of the body of water; and
   performing maintenance on the heat exchanger.

5. The method of claim 4 wherein the working fluid is ammonia.

6. The method of claim 4 wherein the operation of returning the heat exchanger to the surface further comprises altering a length of the first flexible conduit and the second flexible conduit relative to a length of the first flexible conduit and the second flexible conduit when the heat exchanger is at depth $d_1$.

7. The method of claim 4 further comprising re-submerging the heat exchanger after the maintenance is performed.

8. A method comprising:
   submerging a heat exchanger to a depth, $d_1$, below the surface of a body of water;
   transferring to the heat exchanger, from a heat engine at the surface of the body of water and via a first conduit, a vapor phase working fluid;
   condensing the vapor phase working fluid in the heat exchanger;
   returning the condensed working fluid to the heat engine after condensation while the heat exchanger is the depth $d_1$;
   ceasing the condensation of the working fluid; and
   causing the heat exchanger to ascend to the proximity of the surface of the body of water.

9. The method of claim 8 wherein the first conduit is flexible.

10. The method of claim 8 wherein the working fluid is ammonia.

11. The method of claim 8 further comprising performing maintenance on the heat exchanger after it ascends to the proximity of the surface of the body of water.

12. The method of claim 11 further comprising re-submerging the heat exchanger after the maintenance is completed.

13. The method of claim 8 wherein the operation of returning further comprises returning the condensed working fluid to the heat engine via a second conduit.

14. The method of claim 13 wherein the second conduit is flexible.

15. The method of claim 8 wherein the operation of submerging the heat exchanger further comprises lengthening the first conduit.

16. The method of claim 15 wherein the operation of causing the heat exchanger to ascend further comprises shortening the first conduit.

17. The method of claim 8 further comprising re-submerging the heat exchanger after the heat exchanger ascends to the proximity of the surface of the body of water.

* * * * *